Figure 1:
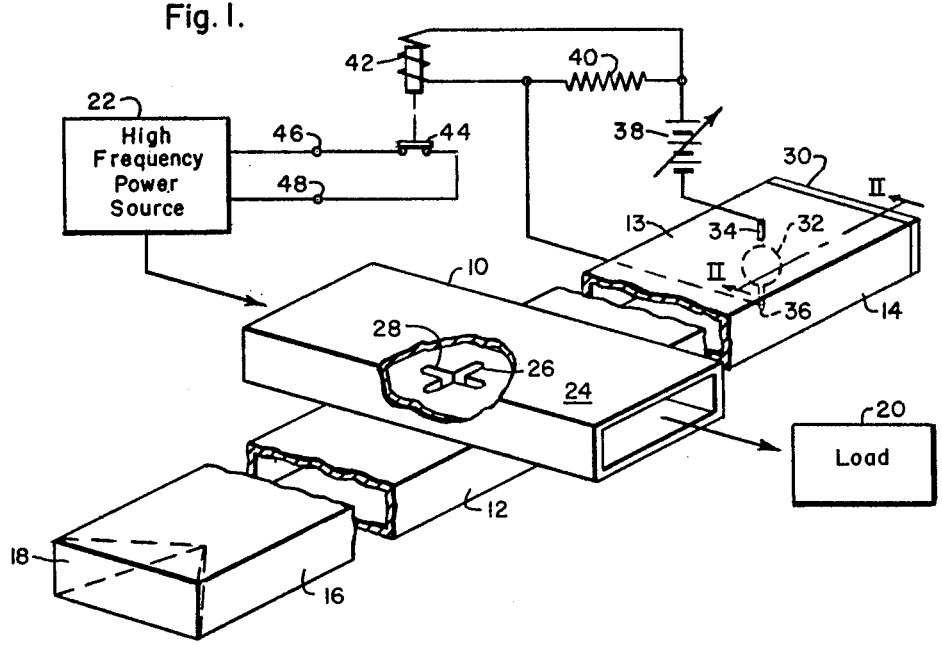

July 18, 1961

D. S. FRIEDMAN ET AL 2,993,181

ELECTROMAGNETIC WAVE ENERGY RESPONSIVE APPARATUS

Filed Dec. 9, 1957

2 Sheets-Sheet 1

WITNESSES:
Bernard R. Gieguay
Robert C. Baird

INVENTORS
David S. Friedman and
Leo Young.
BY
ATTORNEY

United States Patent Office 2,993,181
Patented July 18, 1961

2,993,181
ELECTROMAGNETIC WAVE ENERGY RESPONSIVE APPARATUS
David S. Friedman and Leo Young, Baltimore, Md., assignors to Westinghouse Electric Corporation, East Pittsburgh, Pa., a corporation of Pennsylvania
Filed Dec. 9, 1957, Ser. No. 701,549
1 Claim. (Cl. 333—17)

The present invention relates to electromagnetic wave energy translation systems and more particularly to arrangements for controlling wave translation systems in response to the magnitude of reflected wave energy therein.

The apparatus of the invention finds one application in radar apparatus where as well as in various other electromagnetic wave energy systems which utilize either coaxial transmission lines or hollow waveguides, the high frequency wave energy generators utilized are usually sensitive to and subject to damage by reflection of wave energy from the output end of the system back to the generator. Excessive magnitudes of reflected wave energy in such systems often result in arcing within the transmission lines. In apparatus utilizing magnetron or klystron type discharge devices, reflected wave energy may result in excessive voltage at the vacuum tight dielectric seal of the magnetron and also may result in excessive cathode back-heating in the magnetron generator. Accordingly, it is desirable to minimize the reflected wave energy in such wave energy translation systems and it is particularly necessary to provide means for controlling or disabling the apparatus in case of sudden changes in the impedance of the wave translation system or the load to which it is connected.

It is an object of this invention to provide a novel and simple apparatus responsive to the magnitude of reflected wave energy flow in an electromagnetic wave energy translation system.

It is another object to provide apparatus applicable to wave translation systems for controlling the wave energy applied thereto in response to the magnitude of reflected wave energy flowing therein.

It is a further object of the invention to provide a protective arrangement for wave energy generators which includes means responsive to a predetermined magnitude of reflected wave energy and is operative to interrupt the operation of the generator upon occurrence of such predetermined magnitude of reflected energy.

It is an additional object to provide a control device for automatically interrupting the application of power to a wave energy translation system when the reflected wave energy therein exceeds a predetermined magnitude.

It is a different object of the invention to provide means for automatically interrupting the application of power to an electromagnetic wave energy system in response to a predetermined excessive ratio between the magnitudes of a propagated wave energy pulse and a reflected wave energy pulse.

Briefly described, the present invention utilizes a directional coupler which may be connected to a wave energy transmission line so as to selectively propagate a portion of the energy therein along an adjacent guide with the direction of propagation in the adjacent guide being dependent upon the direction of propagation of the energy in the transmission line. By use of such directional coupler, the reflected wave energy traveling from a load toward a generator may be substantially isolated from energy propagated in the opposite direction. In addition, the invention comprises means associated with the adjacent guide or line section for observing the magnitude of the isolated sample of reflected wave energy and further includes means responsive to the magnitude of such energy for controlling the operation of the wave energy translation system.

Figure 2:
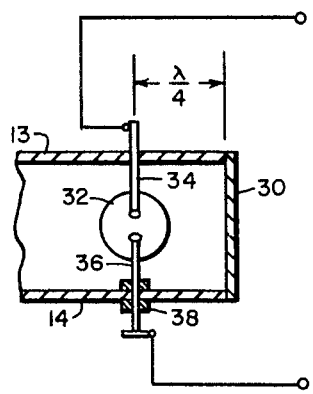
Figure 3:
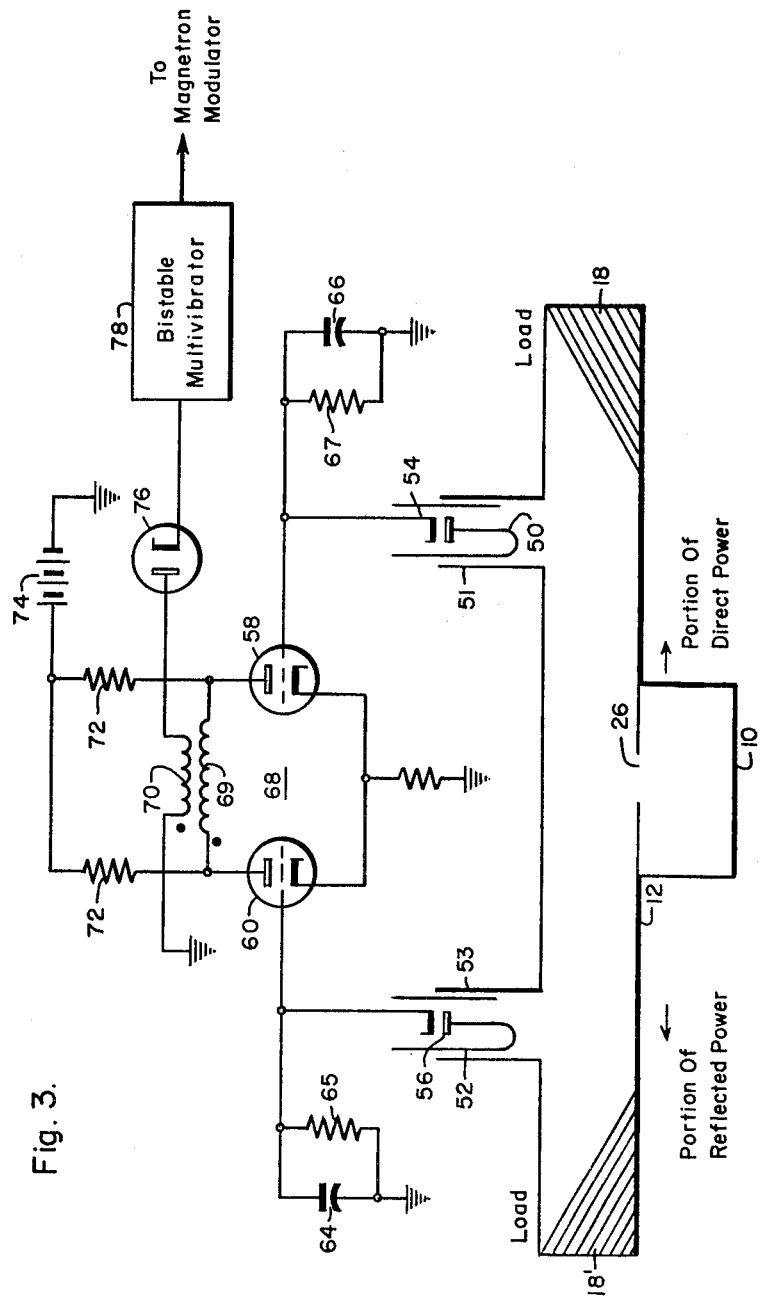

Other and further objects and advantages of the invention will be apparent from the following description, reference being had to the accompanying drawings throughout which like reference characters indicate like parts, which drawings form a part of this application and in which:

FIGURE 1 illustrates a partially broken away perspective view of a waveguide system embodying the invention;
FIG. 2 illustrates a cross sectional view taken substantially along the lines II—II of FIG. 1; and
FIG. 3 illustrates a second embodiment of the invention which is particularly suitable for use in systems employing short time duration pulses of electromagnetic wave energy.

In FIG. 1 there is shown a first waveguide section 10 which comprises a wave energy transmission line extending from a high frequency power source 22 to a high frequency load 20. The high frequency power source may include a magnetron oscillator and appropriate circuitry for supplying energizing voltage thereto such as for example any one of various pulse modulators which are known in the art. The load 20 may comprise a high frequency antenna, a dielectric heating load or any one of various other electromagnetic wave energy consuming devices. Positioned intermediate the ends of waveguide 10 is a second transmission line 12. The line section 12 is preferably substantially at right angles to the line 10 and is adjacent thereto so that the two line sections have a common wall portion at the area where they intersect.

It is to be understood that the line sections 10 and 12 may be arranged to intersect at angles other than 90°, depending upon the configuration desired in a particular embodiment. Within the area of intersection of the lines 10 and 12 a pair of slots 26 and 28 are provided in the common wall portion. The slot 26 is located substantially parallel to the longitudinal axis of the line section 12, and the slot 28 is substantially parallel to the long axis of the line section 10. The common wall portion of the line sections 10 and 12 together with the crossed slots 26 and 28 comprise one embodiment of a directional coupler which may be used in the present invention.

The operation of the foregoing structure as a directional coupler of electromagnetic energy is substantially as follows. Assume that an electromagnetic wave is being propagated in a first direction from the high frequency source 22 toward the load 20 along the transmission line 10. This wave energy will generate currents in the side walls of the line sections 10 which are transverse to the longitudinal axis and will generate currents in the common wall portion which are substantially longitudinal. The transverse currents lead the longitudinal currents by phase angle substantially 90°. Now assume that reflected wave energy is propagated along the line 10 from the end at which the load 20 is connected toward the power source 22. A wave traveling in this second direction will generate transverse currents in the side walls of the line section 10 with the transverse currents being related to the longitudinal currents in the common wall section by a phase angle of approximately minus 90°. That is, to say, the transverse currents of a wave traveling in the first direction lead the longitudinal currents while the transverse currents generated by a wave propagated in the opposite direction lag the longitudinal currents. The cross slots 26 and 28 couple the longitudinal and transverse currents into the second transmission line section 12, and the currents in said second line section will produce and propagate an electromagnetic wave therein with the direction of propagation in the second line section 12 being dependent upon the direction of the wave energy coupled thereinto. More particularly, wave energy propagated in the first direction in line section 10 will be coupled into and propagated along line section 12 substantially exclusively toward one end portion 16. Similarly, reflected wave energy traveling along the line section 10 in the second direction will be coupled into line section 12 and will be propagated therealong substantially exclusively toward end portion 14 thereof. If there is wave energy traveling in both directions simultaneously in the first transmission line section 10, then fractional portions of the individual directional components will both be coupled into the second line section 12 with the reflected wave energy component being propagated exclusively toward the first end portion 14 of the second line section and with the transmitted wave energy component from generator 22 being propagated exclusively toward the second end portion 16 of the second line section. Thus, it is seen that the first line section 10, together with the second line section 12 and the directional coupler comprised of the common wall portion and slots 26 and 28, constitute a means for separating reflected power from primary power traveling from source 22 toward load 20. A portion of the reflected power in first line section 10 appears in the first end portion 14 of the second line section. A portion or sample of the incident wave energy from generator 22 appears in the second end portion 16.

In order to prevent multiple reflection of wave energy in the second line section 12, a non-reflective energy absorbing termination 18 may be provided in the second end portion 16. This termination 18 may conveniently be a wedge shaped piece of hardwood or Bakelite coated with an electrically resistive material such as colloidal carbon or the like. Alternatively, various other non-reflective absorbing terminations known in the art may be used.

As best shown in FIG. 2, the second end portion of line section 12 is provided with a shorting plate 30 disposed substantially perpendicular thereacross so as to effectively short circuit the reflective wave energy arriving thereat. Spaced ¼ wave length from the shorting plate 30 is an electromagnetic wave energy sensitive means which may conveniently comprise a gas-filled electron discharge device 32 having a pair of electrodes 34 and 36, which electrodes are immersed in a gaseous atmosphere within the discharge device 32. The first electrode 34 extends through the upper wall 13 of the line section 12 and is provided with a conductor 15 extending therefrom. If so desired, the electrode 34 may be electrically connected to the upper wall portion 13. The second electrode 36 extends through the bottom wall of the line section 12 and is provided with an insulating sleeve 38 so that the electrode 36 may be maintained at a substantial voltage relative to the metallic wall of line section 12. Electrode 36 is likewise provided with a conductor extending therefrom externally of the end portion 14 of line section 12 to an external terminal. The gas-filled discharge device 32 is connected in series with a source of biasing potential 38 and a resistor 40 comprising a control circuit responsive to the discharge device 32 for controlling the application of power to the high frequency generator 22. To this end a relay coil 42 is connected in parallel with the resistor 40 and is arranged to operate a pair of contacts 42 which are connected to the high frequency generator by conductors 46 and 48. The connection of conductors 46 and 48 to the high frequency generator 22 are preferably such that the high frequency generator will be prohibited from operating when the contacts 44 are open. More specifically, in the case of apparatus utilizing a magnetron oscillator as the high frequency generator, the contacts 44 may be connected to the driver stage of the magnetron modulator circuit so that the modulator is prohibited from applying anode voltage to the magnetron when the normally closed contacts 44 are open.

It is to be emphasized that the protective arrangement of the present invention is not restricted to the use of the particular cross slot directional coupler as shown in FIG. 1. Any one of various directional couplers known in the art may be utilized for directionally coupling energy from first transmission line 10 to a second transmission line 12. Specifically, if so desired, the protective system of the present invention may use a multi-slot directional coupler of the type manufactured by Hewlett-Packard and designated as Model No. S752–D. Likewise, the systems of the present invention is not restricted to the use of rectangular waveguide transmission lines as shown in FIG. 1, but may be applied to coaxial transmission lines as well with a suitable directional coupler which is adapted for use with coaxial transmission lines being substituted for the particular cross slot directional coupler shown. Similarly, the system is readily adaptable for use with circular or elliptical waveguides as well as various other types of waveguide known to persons skilled in the art.

The operation of the protective circuit as shown in FIG. 1 is substantially as follows. Let it be assumed that a change in the impedance of the load 20 occurs such that an unsafe mismatch is present between the transmission line 10 and the load 20. The impedance mismatch gives rise to reflected wave energy propagated from the load 20 along the line section 10 toward the wave energy source 22. A predetermined portion of this reflected wave energy is coupled into the second line section 12 and is propagated substantially exclusively along the line section 12 toward the first end portion 14. The gas discharge device 32 is positioned in the end portion 14 approximately ¼ wave length from the shorting plate 30 and hence is subjected to a maximum radio frequency electric field generated by the reflected wave energy arriving thereat. The electromagnetic field in the vicinity of discharge device 32 causes ionization in the atmosphere between the electrodes 34 and 36 thereby initiating current flow from bias voltage source 38 through resistor 40 and through discharge device 32. The voltage thus generated across resistor 40 is sufficient to energize relay coil 42 so as to open the contacts 44 thereby disabling the high frequency power source 22 and terminating the application of wave energy to the transmission line 10.

In FIG. 3 is shown a second embodiment of the present invention which is particularly advantageous for controlling wave energy systems in which the wave energy is propagated along a transmission line section 10 in short duration recurrent pulses. The transmission line section 10 as shown in FIG. 3 is substantially similar to the corresponding line section 10 of FIG. 1, is fed with electromagnetic wave energy from a magnetron oscillator and transmits such energy to a load in substantially the same manner as shown in FIG. 1. A predetermined portion of the wave energy transmitted along line section 10 is coupled into a second transmission line section 12 through coupling slot 26. Similarly, a portion of reflected wave energy propagated along line section 10 in the opposite direction is coupled into the second line section 12 and is propagated therealong toward a termination 18. For simplicity, the directional coupler utilized in the embodiment of FIG. 3 is shown simply as a coupling slot 26. It is to be understood that the directional coupler of FIG. 3 may be substantially identical to that shown and described with reference to FIG. 1 or alternatively may be any one of a number of directional couplers known in the art. The essential criteria of the directional coupler for use in the present invention is that it shall be operative to couple a portion of the energy traveling in a first direction along the line section 10 into line section 12 with said portion of energy being propagated directionally and exclusively along the line section 12 toward the non-reflective termination 18' and that it shall similarly couple reflected energy traveling in the opposite direction in line section 10 into line 12 with said reflected wave energy being propagated along line 12 in the opposite direction toward a non-reflecting termination 18.

Thus, it is seen that line sections 10 and 12, together with the directional coupler therebetween, as shown in FIG. 3, function in substantially the same manner as the corresponding structure of FIG. 1 so that a predetermined fraction of the reflected wave energy in line section 10 is propagated to non-reflective termination 18, while a similar fraction of the primary energy traversing line 10 is coupled and propagated to non-reflecting termination 18′.

Intermediate of its ends line section 12 is provided with a pair of coupling stubs 51 and 53. The coupling stub 51 is located between the directional coupler 24 and the first non-reflective termination 18. The second coupling stub 53 is located along line section 12 between the directional coupler 24 and the second non-reflective termination 18′. The stubs 51 and 53 are preferably soldered to the line section 12 with a portion of the line being cut away in order that a portion of the wave energy in the line adjacent the stubs may be coupled into the stubs 51 and 53. Within the stub 51 there is provided a coupling loop 50 and a diode 54 serially connected therewith for extracting energy from the stub. A similar coupling loop 52 and a diode 56 are provided within the second coupling stub 53. The diode 54 is connected to ground through an integrating capacitor 66 and a grid leak resistor 67 connected in parallel with the capacitor 66. The diode 54 is further connected to the grid electrode of a first control valve 58. Similarly, the diode 56 is connected to ground through an integrating capacitor 64 and through a grid leak resistor which is connected in parallel with the capacitor 64, and is connected to the control electrode of a second control valve 60. The cathodes of the first and second control valves 58 and 56 are interconnected and connected to ground through a cathode biasing resistor 62. The plates of valves 58 and 56 are respectively connected through a pair of load resistors 72 to the positive terminal of a plate voltage supply source 74. A pulse transformer 68 having a primary winding 69 and a secondary winding 70 is connected to the control valves 58 and 60 with the respective ends of the primary winding 69 being connected to the anodes of control valve 58 and control valve 60. The secondary winding of pulse transformer 68 has one end connected to ground and the other end connected to a third diode 76 and thence serially to the input circuit of a bistable multivibrator 78. The diode 76 is provided in series with the secondary winding and the input to the multivibrator 78 to prevent pulses smaller than a predetermined magnitude from being transmitted to the multivibrator. The multivibrator 78 may be of a conventional bistable type with its essential characteristic being that it is responsive to short-time duration pulses from the diode 76 and is operative to provide a long-time duration voltage at its output when triggered by a short-time duration input signal or pulse.

The output circuit of multivibrator 78 may be connected to an appropriate portion of the magnetron modulator circuit in accordance with known practices so as to prohibit energization of the magnetron after multivibrator 78 is switched to its second bistable state. Thus multivibrator 78 is operative when triggered to apply a cutoff biasing or disabling signal to the magnetron pulse generator.

The operation of the apparatus of FIG. 3 is substantially as follows. When a pulse of ultra high frequency wave energy is propagated from the high frequency generator 22 along the line section 10 toward the load 20, a predetermined fraction of such pulse will be coupled into the second line section 12 and will be propagated therealong to the termination 18′. Assuming that there is a mismatch between the line section 10 and the load 20, a pulse of reflected wave energy will travel in the opposite direction along the line section 10 and a similar predetermined fraction of the reflected wave energy pulse will be coupled into the second line section 12 and will be propagated therealong substantially exclusively toward the termination 18. Coupling loop 50 will detect the reflected wave energy in second line section 12 and will apply a signal to the control electrode of discharge device 58, which signal corresponds to the magnitude of the reflected wave energy in line 10. Similarly, coupling loop 52 and diode 56 operate to detect the primary wave energy in the second end portion of line section 12 and apply a signal to the control electrode of valve 60, which signal is substantially proportional to the magnitude of primary wave energy propagated from generator 22 toward load 20. Electron valves 58 and 60 operate cooperatively as a difference amplifier to provide an output signal across the primary winding 69, which output signal is in the form of a pulse having a magnitude substantially proportional to the difference between the primary wave energy pulse and the reflected wave energy pulse in line section 10. Secondary winding 70 applies the output pulse to the multivibrator through diode 76. Thus, the voltage across secondary winding 70 is directly proportional to, and is an accurate measure of, the standing wave ratio in the transmission line 10. The adjustable coupling loops 50 and 52 may be arranged in accordance with conventional practices so that the rectified pulses appearing at the grids of valves 58 and 60 are substantially equal when the standing wave ratio in line 10 is a predetermined critical value. When the standing wave ratio is below that predetermined critical value, secondary winding 70 will apply a negative pulse to diode 76, and diode 76 will block the negative pulse thereby preventing it from being applied to the multivibrator 78. When the standing wave ratio in line section 10 is greater than the aforesaid predetermined critical value, the signal applied to the control electrode of valve 58 will be greater than the signal applied to the control electrode of valve 60, and secondary winding 70 will accordingly apply a positive pulse to diode 76, which positive pulse will be freely conducted by diode 76 and will operate to trigger the bistable multivibrator 78. When multivibrator 78 is triggered, it applies a direct current voltage of sufficient magnitude to thereafter prohibit application of energizing potential to the magnetron. The magnetron oscillator is controlled so as to interrupt generation of wave energy pulses in the same manner as heretofore described in connection with FIG. 1. Appropriate circuit means may be provided for recycling the multivibrator 78 after the mismatch condition has been corrected.

Apparatus constructed in accordance with the present invention may take many physical forms, and no attempt has been made to illustrate more than the two examples. Accordingly, it is intended that the invention shall not be limited by the herein described details, but only by the prior art. Specifically, the term "directional coupler" shall not be limited to the specific cross slot coupler illustrated, but shall be understood to mean a device consisting of a first transmission line section, a second transmission line section, with coupling means connected to each intermediate the ends thereof in a manner such that when there is wave energy traveling in both directions in the first line section, a portion of the wave energy traveling in the first direction will be propagated in the second line section in one direction, while a portion of the wave energy traveling in the opposite direction in the first line section will be propagated in the second line section in a second direction. While the present invention has been shown in a few specific forms only, it will be obvious to those skilled in the are that it is not so limited, but is susceptible of various other changes and modifications without departing from the spirit and scope thereof.

We claim as our invention:

In combination with an ultra high frequency wave energy system including a high frequency generator and a load, a first rectangular waveguide connected between said generator and said load, a second waveguide disposed substantially perpendicular to and adjacent said first waveguide so that said waveguides have a common side wall portion, directional coupling means comprising a pair of substantially perpendicular crossed slots in second common side wall portion for coupling wave energy reflected by said load substantially exclusively into one end portion of said second waveguide, a gaseous discharge device positioned within said end portion of the second waveguide, said discharge including a pair of electrodes in a gaseous atmosphere subject to ionization by said wave energy, a source of biasing voltage, and circuit means serially connected with said source and said electrodes for interrupting the operation of said high frequency generator in response to ionization of said gaseous atmosphere.

References Cited in the file of this patent

UNITED STATES PATENTS

| | | |
|---|---|---|
| 2,505,534 | Fiske | Apr. 25, 1950 |
| 2,546,500 | Hall | Mar. 27, 1951 |
| 2,575,799 | Doherty | Nov. 20, 1951 |
| 2,580,678 | Hansen | Jan. 1, 1952 |
| 2,693,566 | Hooper | Nov. 2, 1954 |
| 2,745,067 | True | May 8, 1956 |
| 2,860,244 | Crowley | Nov. 11, 1958 |
| 2,870,419 | Riblet | Jan. 20, 1959 |